3,262,865
CHEMICAL TREATMENT AND DISTILLATION OF SEA WATER
Oscar B. Waters, Jr., Simpsonville, Md., assignor, by direct and mesne assignments, of one-half to W. R. Grace & Co., New York, N.Y., a corporation of Connecticut, and one-half to the United States of America as represented by the Secretary of the Interior
No Drawing. Filed July 15, 1963, Ser. No. 295,220
3 Claims. (Cl. 203—7)

This invention relates to sea water. In one particular aspect it relates to an improved process for recovering valuable by-products when sea water is distilled to produce potable water.

This invention arose from work done under Contract No. 14-01-0001-281 with the Office of Saline Water in the Department of the Interior, entered into pursuant to the Saline Water Act, Public Law 87,295.

In summary, this invention is directed toward a process for recovering substantially pure gypsum and substantially pure magnesium hydroxide as by-products when sea water is distilled in a tubular heat exchanger to produce potable water and still waste. In the process of my invention, sulfuric acid, added to prevent the deposit of scale on the surface of the heat exchanger's tubes during distillation, is concentrated in the still waste. Subsequent to the distillation, sufficient lime (calcium oxide, calcium hydroxide, or a mixture of calcium oxide and calcium hydroxide) is added to the still waste to neutralize said waste and adjust the pH thereof to about 7.0–9.5, and calcium chloride is added in such quantity that the total calcium ion concentration in the resulting mixture is substantially equivalent stoichiometrically to the sulfate ion concentration in the mixture, thereby precipitating substantially pure gypsum which is separated from the thus treated still waste. Subsequently, sufficient lime is added to adjust the pH of the thus treated still waste to about 10.4, thereby precipitating substantially pure magnesium hydroxide which is separated from the thus treated still waste which can be discharged as effluent.

In one embodiment of this process I prefer to supply calcium chloride to the lime-treated (pH about 7.0–9.5) still waste by recycling effluent from said process to the neutralized waste in such quantity as to render the total calcium ion concentration in the resulting mixture substantially equivalent stoichiometrically to the sulfate ion concentration in said mixture, thereby precipitating substantially pure gypsum. Subsequently, the gypsum can be separated from the liquor, and substantially pure magnesium hydroxide can be precipitated from the thus treated liquor to about 10.4. After separating the thus precipitated magnesium hydroxide, the effluent liquor can be discarded or recycled to treat more still waste.

In many arid regions near the sea potable water is prepared by the distillation of sea water. In this process it is customary to add sulfuric acid to the sea water before distilling to prevent the precipitation of scale on the surface of the heat exchanger's tubes. Since sulfuric acid is not volatile, it remains in the liquid phase and is discharged with the still waste. This creates a waste disposal problem, because many jurisdictions object to the discharge of acid into the sea. Accordingly, this objection has been overcome by neutralizing the free acid with lime (calcium oxide, calcium hydroxide, or mixtures thereof) before discharging the still waste into the sea.

Previous to my invention it was not possible to recover substantially pure magnesium hydroxide from still waste resulting from the distillation of sea water, because both gypsum and magnesium hydroxide were precipitated simultaneously when lime was added to bring the pH of the said waste to the range at which magnesium hydroxide precipitates. My process makes it possible to recover commercial quantities of substantially pure gypsum (suitable for use as a building material and as an agent for reclaiming alkali soil) and substantially pure magnesium hydroxide (suitable for use in the manufacture of refractory bricks and in the preparation of non-burning fertilizers) from the aforesaid still waste.

The process of my invention is illustrated by the following examples:

*Example 1*

Sulfuric acid was added to raw sea water (containing about 2.64 g. sulfate (as $SO_4^=$) and about 5.09 g. of $MgCl_2$ per liter) at the rate of about 0.406 g. of $H_2SO_4$ per liter, thereby adjusting the pH to about 2.5–3.5. The resulting solution was distilled in a tubular heat exchanger giving about one liter of potable water and about one liter of still waste for each 2 liters of sea water fed to the still. Since sulfuric acid is not volatile, substantially all of this acid added to the raw water remained in the still waste. Lime was added to the still waste at the rate of about 0.556 g. of CaO per liter of said waste, thereby adjusting the pH of the solution to about 7.0–9.5. Subsequently, calcium chloride ($CaCl_2$) was added at the rate of about 5.93 g. per liter, thereby rendering the total calcium ion concentration in the resulting mixture substantially equivalent stoichiometrically to the sulfate ion concentration in said mixture. This resulted in the precipitation of substantially pure gypsum which was separated from the liquor and recovered. About 10.90 g. of gypsum was recovered from each liter of still waste treated. After separating the gypsum, lime was added to bring the pH to about 10.4, thereby precipitating substantially pure magnesium hydroxide. This required about 4.56 g. of CaO per liter of still waste. The precipitated magnesium hydroxide was separated and recovered. About 5.04 g. of magnesium hydroxide was recovered from each liter of still waste. The liquor from which the magnesium hydroxide was recovered constitutes an effluent which can be discharged into the sea, or recycled to furnish calcium ions for the precipitation of gypsum.

The following example illustrates the use of the recycle process.

*Example 2*

Sulfuric acid was added to raw sea water (containing about 2.64 g. sulfate (as $SO_4^=$) and about 5.09 g. $MgCl_2$ per liter) at the rate of about 0.406 g. per liter thereby adjusting the pH to about 2.5–3.5. The resulting solution was distilled by the process described in Example 1 to yield about one liter of potable water and about one liter of still waste for each 2 liters of sea water fed to the still. Lime was added to the still waste at the rate of about 1.56 g. of CaO per liter of said waste, thereby adjusting the pH of the thus treated still waste to about 7.0–9.5. Subsequently, effluent from Example 1 was added to the lime-treated still waste at such rate as to render the total calcium ion concentration in the resulting mixture substantially equivalent stoichiometrically to the sulfate ion concentration in said mixture. (In this instance about 0.50 liter of effluent was required per liter of still waste.) This resulted in the precipitation of substantially pure gypsum which was separated from the liquor and recovered. It was found that about 10.90 g. gypsum was recovered from each liter of still waste treated. Subsequent to separating the gypsum from the said still waste, lime was added to the thus treated still waste at the rate of about 4.56 g. per liter of still waste. This treatment brought the pH of the mixture to about 10.4 and resulted in the precipitation of substantially pure magnesium hydroxide which was separated and recovered at the rate of about 5.04 g. per liter of still waste treated.

The liquor from which magnesium hydroxide was recovered constitutes an effluent which can be discharged into the sea, or recycled to furnish calcium ions for the precipitation of gypsum.

I claim:

1. In the process for preparing potable water by distilling sea water in a tubular heat exchanger wherein the products are potable water and still waste, wherein sulfuric acid is added to prevent the deposit of scale on the heat exchangers tubes and concentrates in the still waste, and wherein the sulfuric acid in said still waste is neutralized with lime before discharging said still waste, the improvement comprising:

(a) Adding sufficient lime to said still waste to neutralize said waste and adjust its pH of said waste to about 7.0–9.5;
   (b) Adding calcium chloride to said neutralized waste in such quantity that the total calcium ion concentration in the resulting mixture is substantially equivalent stoichiometrically to the sulfate ion concentration in said mixture, thereby precipitating substantially pure gypsum;
   (c) Separating the thus precipitated gypsum from the thus treated still waste;
   (d) Adding sufficient lime to the thus treated still waste to adjust the pH thereof to about 10.4, thereby precipitating magnesium hydroxide;
   (e) Separating the thus precipitated magnesium hydroxide from the thus treated still waste to leave a remaining effluent.

2. The process of claim 1 in which calcium chloride is supplied to the lime-treated still waste by recycling effluent from said process to the lime-treated waste in such quantity as to render the calcium ion concentration in the resulting mixture substantially equivalent stoichiometrically to the sulfate ion concentration in said mixture.

3. The process of claim 1 in which, after adding sufficient lime to adjust the pH of the still waste to about 7.0–9.5, effluent is added to the lime-treated still waste in such quantity that the total calcium ion concentration in the resulting mixture is substantially equivalent stoichiometrically to the sulfate ion concentration in said mixture.

References Cited by the Examiner

UNITED STATES PATENTS

| | | |
|---|---|---|
| 2,756,035 | 7/1956 | Axelrad et al. |
| 3,119,752 | 1/1965 | Checkovich _____ 203—11 |
| 3,218,241 | 11/1965 | Checkovich _____ 203—7 |

NORMAN YUDKOFF, *Primary Examiner.*

F. E. DRUMMOND, *Assistant Examiner.*